United States Patent [19]

Schwenninger et al.

[11] Patent Number: 4,969,942
[45] Date of Patent: Nov. 13, 1990

[54] GLASS MELTER EXHAUST DUCT CLEANING METHOD AND APPARATUS

[75] Inventors: Ronald L. Schwenninger, Ridgeley, W. Va.; John K. Groetzinger, LaVale, Md.

[73] Assignee: PPG Industries, Inc., Pittsburgh, Pa.

[21] Appl. No.: 459,622

[22] Filed: Jan. 2, 1990

[51] Int. Cl.[5] ............................................. C03B 5/10
[52] U.S. Cl. .............................. 65/27; 65/134; 65/335; 65/168; 15/316 R; 134/34
[58] Field of Search ............... 134/24, 34, 42; 15/316; 65/27, 134, 136, 335, 168

[56] References Cited

U.S. PATENT DOCUMENTS

| | | | |
|---|---|---|---|
| 3,734,701 | 5/1973 | Pecoraro et al. | 65/27 |
| 3,811,854 | 5/1974 | Pecoraro | 65/27 |
| 4,193,635 | 3/1980 | Thiruvengadam et al. | 134/34 X |
| 4,519,814 | 5/1985 | Demarest | 65/27 |
| 4,668,272 | 5/1987 | Newcamp et al. | 65/335 |
| 4,675,041 | 6/1987 | Tsai | 65/27 |
| 4,678,491 | 7/1987 | Tsai | 65/27 |
| 4,747,772 | 5/1988 | Tsai | 431/354 |

Primary Examiner—Robert L. Lindsay
Attorney, Agent, or Firm—Dennis G. Millman

[57] ABSTRACT

Deposits of glassmaking materials are removed from an exhaust duct by periodic blasts of air from a plurality of nozzles mounted in the duct. The arrangement avoids the disruption caused by manual cleaning and permits more frequent removal of deposits, thereby minimizing perturbations to the glassmaking process.

18 Claims, 2 Drawing Sheets

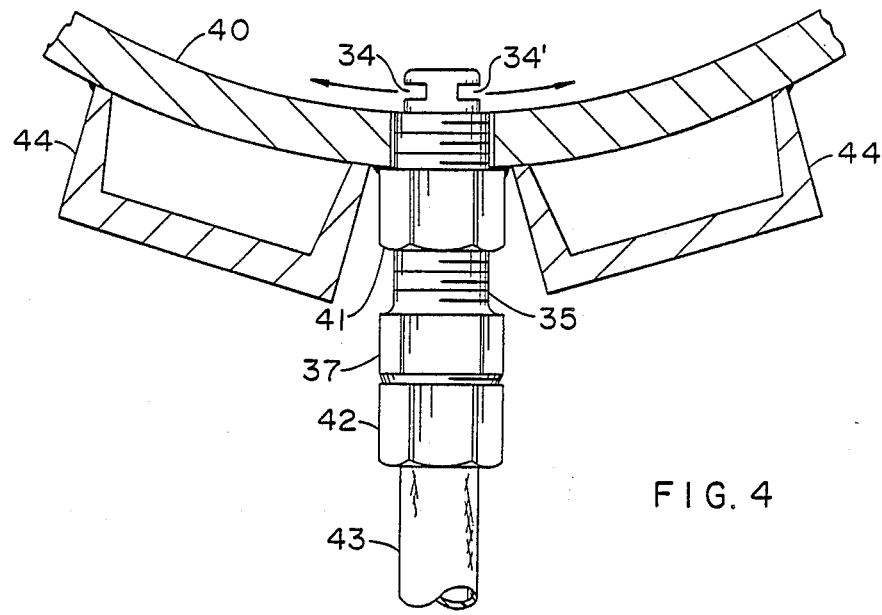
FIG. 4
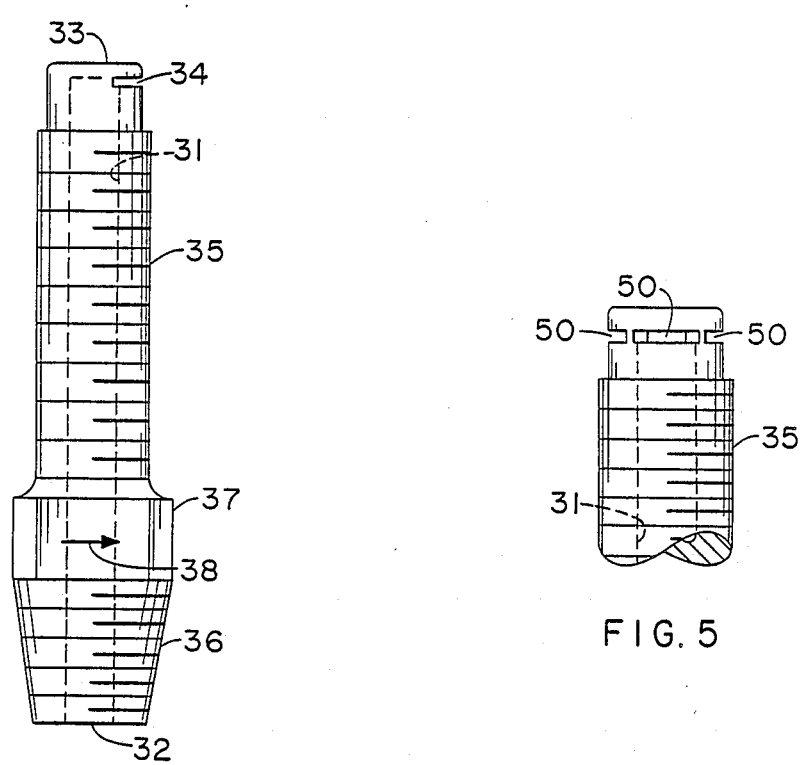
FIG. 3
FIG. 5

GLASS MELTER EXHAUST DUCT CLEANING METHOD AND APPARATUS

BACKGROUND OF THE INVENTION

Glass melting processes of the type disclosed in U.S. Pat. No. 4,519,814 (Demarest) involve heat recovery by directing exhaust gas from a melting zone into a batch material preheating zone. A duct carrying high temperature exhaust between the two zones is prone to having particulate and evaporated material carried with the exhaust deposited on its interior surfaces. This deposition of material can grow to the extent of adversely affecting the free flow of exhaust gas through the duct, thereby requiring periodic cleaning of the duct.

Opening the duct to scrape or blow the deposits off is undesirable because it is disruptive to the continuity of combustion conditions, exhaust gas flow patterns, and temperatures, which in turn can upset the melting process. Additionally, dislodging the deposited material and permitting it to enter the melting process can cause undesirable compositional variations in the product material. This is particularly a problem for glassmaking because even slight inhomogeneities in the glass result in variations in the refractive index that are perceived as distortion in the product glass. A compositional shift can also cause bubbles in the glass. The deposits differ in composition from the main batch material mixture because it is the more finely divided or volatile constituents of the batch mixture that become entrained disproportionately in the exhaust gas stream. Furthermore, manual removal of deposits is not easy and is sometimes required every few hours, thereby increasing the demands placed on operating personnel.

U.S. Pat. No. 4,678,491 (Tsai) discloses a technique for preventing deposition of material within an exhaust gas duct in a glass melting operation of the same type involved here. The technique involves directing a stream of air into the duct to alter the exhaust gas flow pattern within the duct to thereby prevent deposition of entrained material on selected areas of the duct. This approach may have merit with a relatively small operation where only small, specific areas are subject to accumulation of the deposits, but in a large system that approach may become impractical because of the large number of air streams needed to prevent deposition on the more extensive duct area involved. Injecting a large amount of additional gas into the duct is undesirable because it dilutes the exhaust gas, thereby reducing the exhaust gas temperature and reducing the efficiency of heat transfer from the exhaust gas to the batch materials in the preheating step. It is also undesirable to add to the volume of the exhaust gas stream because larger gas volume results in either a requirement for a larger preheating vessel or increased gas velocity with an associated greater entrainment of batch material in the preheating stage.

The problem is compounded in cases where the duct is cooled, such as by circulation of water through conduits in contact with the duct, for the sake of extending the service life of the duct. The relatively low temperatures of the interior surfaces of a cooled duct promote greater deposition and solidification of material over a wider area of the duct. Therefore, removal of deposits is required more frequently, and previous techniques have been found inadequate.

SUMMARY OF THE INVENTION

In the present invention deposits of glassmaking materials on an exhaust duct are dislodged and removed from the duct by means of intermittent blasts of pressurized gas, preferably air. The blasts are discharged from nozzles that are closely adjacent to the interior surface of the duct and configured to strip a layer of deposited material from the surface. By using short blasts of gas, a very small volume of gas is used in relation to the volume of the exhaust gas stream, so the exhaust gas stream is not significantly diluted by the injected gas. A plurality of nozzles can be used to provide cleaning to a substantial area of the duct without requiring a large volume of gas to be injected. Additionally, each of the plurality of nozzles can be actuated individually or in groups, whereby the amount of compressed gas required at any time is minimized. Because a small volume of gas is required, cleaning of the duct can be performed frequently, before a large amount of material becomes deposited. Frequent removal of small amounts of material results in smaller and less disruptive compositional variations when the removed material re-enters the feed stream of batch material. Disrupting the glassmaking process is also avoided by the fact that the cleaning method of the invention does not require opening the duct. The invention also lends itself to automatic operation, thereby freeing operators from the task of cleaning the duct.

An optional feature of the invention is sequential operation of nozzles or groups of nozzles to move dislodged material in a selected direction. By this technique, material dislodged by one nozzle can be propelled further along the duct toward an end by the next nozzle when it is subsequently activated.

THE DRAWINGS

FIG. 3 is an enlarged side elevational view of an example of a cleaning nozzle that may be employed in the present invention.

FIG. 4 is an enlarged, transverse cross-sectional view through a duct, showing an example of a nozzle mounting arrangement in accordance with the present invention.

FIG. 5 is an enlarged side elevational view of an alternative nozzle arrangement having multiple orifices that may be used with the present invention.

DETAILED DESCRIPTION

The invention has particular applicability to a glassmaking operation since the batch material mixture is comprised of pulverulent materials of various particles sizes. As a result, entrainment of batch particles in the exhaust gas stream and deposition in exhaust ducts disproportionately involves the constituents having smaller particle size. The deposits are typically found to consist principally of calcium and magnesium compounds derived from the limestone and dolomite constituents of the batch. Sodium oxide is also usually found in significant amounts in the deposits, having been vaporized in the melting zone and carried away by the exhaust. Accordingly, the problems addressed by the present invention may be present in virtually any glassmaking process that is heated by combustion. Although the present invention is not intended to be limited to any particular glassmaking process, it will be described in detail in connection with the type of process disclosed in U.S. Pat. No. 4,519,814 (Demarest), in which the present invention is particularly useful.

Figure 1:
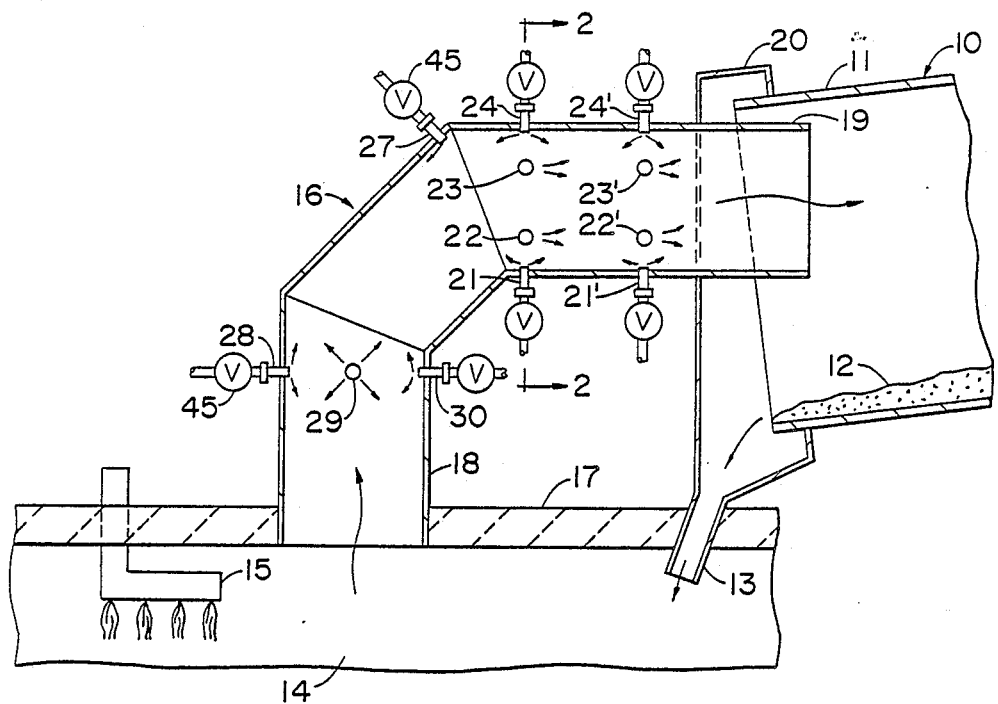
FIG. 1 is a schematic, cross-sectional, side view of a duct interconnecting a melter and a preheater, incorporating an embodiment of the duct cleaning arrangement of the present invention.

In FIG. 1 there is shown an example of a portion of a glassmaking operation in which loose, pulverulent, batch material is preheated by exhaust from a melting furnace, and the site of potential build-up of deposits is in the connecting duct between the preheater and the melter. The preheater 10 may be in the form of a cylindrical, rotating kiln 11 in which the batch material 12 is tumbled while in contact with hot exhaust gases. Only the batch discharge end of the kiln 11 is shown in FIG. 1. The preheater may take other forms, such as a fluidized bed. The kiln 11 may be inclined downwardly toward the batch discharge end so that the batch is transported along the length of the kiln and discharged from the end into a chute 13 that directs the batch into a melting vessel 14. The melting vessel may take the form of any known apparatus for melting glass, but a particular embodiment suitable for the example shown in the drawings is the liquefying vessel disclosed in U.S. Pat. No. 4,668,272 (Newcamp et al.). The interior of vessel 14 may be heated by one or more burners, burner 15 shown in FIG. 1 being an example of one type of burner. Details of the burner 15 may be found in U.S. Pat. No. 4,747,772 (Tsai). Exhaust from vessel 14 passes into a duct 16 through an opening in a lid 17 of the vessel 14, and is directed into the preheater 10. The duct 16 may have a wide variety of configurations, but the illustrated configuration that is associated with directing exhaust gas from a lid opening to a rotating kiln by way of a substantially right angle bend is an example that is particularly susceptible to accumulation of deposits. In this example the duct 16 includes a vertical section 18 and a horizontal section 19 between which there may be an angled or curved segment. The duct may extend through a stationary housing 20 that encloses the end of the rotating kiln 11. The cross-sectional shape of the duct may be circular, square, rectangular, or virtually any other polyhedral shape.

Figure 2:
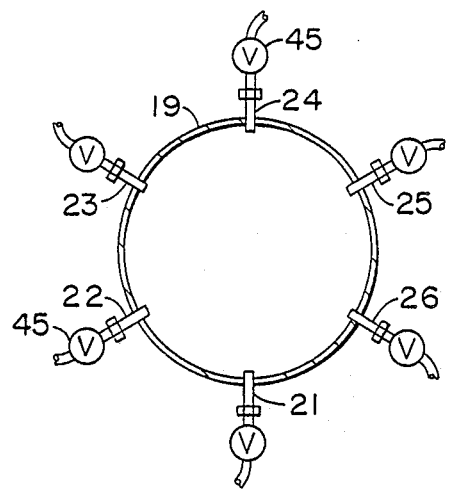
FIG. 2 is a schematic cross-sectional view of the duct of FIG. 1 taken along line 2—2 showing an example of an arrangement of nozzles around the circumference of the duct.

Removal of deposits is effected in the present invention by means of a plurality of nozzles arranged in a selected pattern in at least the region in which the most troublesome deposits occur. The particular pattern chosen depends upon the tendencies of a specific exhaust duct structure under specific operating conditions to accumulate deposits in certain areas. Of course, the entire interior duct surface may be subjected to the cleaning action of the present invention, but for the sake of economy it is generally preferred to treat only the area observed to have significant amounts of deposits. Therefore, a wide variety of arrangements is possible, one example of which is shown in FIG. 1 in relation to a specific example of an exhaust duct 16. With this particular duct arrangement, the largest concentration of nozzles may be in the horizontal section 19 of the duct, which is the area most susceptible to deposits. In a region of heavy deposits such as this, it is preferable to provide a plurality of nozzles spaced apart longitudinally (i.e., in the direction of exhaust gas travel), as well as circumferentially as shown. The circumferential spacing of nozzles 21, 22, 23, 24, 25, and 26 may be relatively uniform as shown in FIG. 2, or a greater concentration of nozzles may be provided at the bottom or the top of the horizontal duct section 19 if the deposition rate is greater in one of those regions. Non-symmetrical arrangements may be useful in some situations.

Referring again to FIG. 1, a similar array of nozzles, for example 21'-24' may be located in the horizontal duct section 19 spaced from the first array 21-26 in the axial direction, that is, in the direction of exhaust gas flow. Spacing nozzles or groups of nozzles along the length or the duct permits nozzles to be activated sequentially so as to progressively propel dislodged material toward one end of the duct, preferably toward the preheater 10. Two rows of nozzles are shown in FIG. 1, but it should be understood that larger numbers of rows may be required, depending upon the dimensions of the duct. For the sake of propelling material toward one end, it is preferred that at least some of the nozzles in the bottom area of a horizontal duct section be designed to direct most of their discharge streams primarily in that direction. Thus, nozzles 21, 22, and 26 may preferably be directional, with their orifices oriented to produce jets that are substantially parallel to the direction of exhaust gas flow. Other nozzles need not be directional. For example, nozzle 24 at the top portion of duct 19 may be provided with a radiating discharge pattern. Other suitable locations for nozzles shown in FIG. 1 include areas near corners or joints such as the location of nozzle 27, or vertical areas such as the locations of nozzles 28, 29, and 30. Nozzle 27 may be either the directional or the radiating type. Although it is generally easier to propel the dislodged materials from the duct co-current with the exhaust gas flow, it may be more practical in locations such as those of nozzles 28, 29, and 30 to direct their gas discharges countercurrent to the exhaust gas flow so as to drive material toward the melter 14. On vertical duct walls such as in section 18, it may be preferred for nozzles such as nozzles 28, 29, and 30 to be the radiating type as shown in FIG. 1.

Although it might be possible for the present invention to use a plurality of elongated, adjustable nozzle tubes as in U.S. Pat. No. 4,678,491 (Tsai), the large number of nozzles usually required would lead to a very cluttered duct and would make the use of that type of nozzle cumbersome. Therefore, it is preferred that each nozzle extends directly through the duct wall to the surface that it is intended to act upon. This advantageously leaves the interior of the duct relatively streamlined. Although the nozzles may be stationary, coverage of large areas is achieved by employing relatively large numbers of nozzles. As a result, no manipulation by operators is required during the cleaning method of the present invention. In their simplest form, the nozzles for the purpose of the present invention may consist of a simple orifice in the wall of the duct 16 with a connection to a source of pressurized gas. Such a simple orifice that discharges gas perpendicular to the surface of the duct may serve the purpose of dislodging deposits in accordance with the objectives of the present invention. However, it is preferred for the sake of more efficient use of pressurized gas that the gas be discharged in a direction substantially parallel to the inner surface of the duct, which may be accomplished by providing a nozzle structure protruding into the duct with at least one orifice in its side.

An example of a preferred nozzle structure designed to discharge gas parallel to the duct surface is shown in FIG. 3. A directional embodiment in shown in FIG. 3 of a type suitable for use in locations such as nozzles 21, 22, 23, 25, and 26 in FIGS. 1 and 2. The nozzles shown in the drawings are adapted for a threaded connection to the duct, but it should be apparent that other means of connecting may be used such as clamping or welding. The threaded arrangement is preferred because it permits adjusting the penetration of the nozzle into the duct and permits rotating the direction of discharge. The nozzle shown in FIG. 3 (as well as the variations shown in FIGS. 4 and 5) may be comprised of a generally cylindrical body having a central bore 31 which is open at the inlet end 32 and closed at the outlet end 33. An orifice 34 extends through a side of the nozzle body near the outlet end into communication with the central bore 31. In the embodiment of FIG. 1 the orifice 34 takes the form of a single, narrow cut perpendicular to the axis of the nozzle body, whereby a thin, fan-shaped discharge pattern is produced. Since the orifice is on one side of the nozzle in the FIG. 3 embodiment, the discharge is directed to one side of the nozzle, at right angles to the axis of the nozzle, and with a predetermined angle of spread. The nozzles of FIG. 3 is therefore directional, and not only can be used for dislodging deposits, but also serves the function of propelling the dislodged material in a predetermined direction. A single orifice also has the advantage of a higher velocity discharge for a given air pressure, which in some circumstances may provide greater cleaning power and may permit a longer distance to be affected by the nozzle. Instead of a slot shaped orifice, the orifice could be a cylindrical bore. A single bore would provide a very narrow discharge, and a plurality of cylindrical bores on one side of the nozzle would produce a wider angle while still retaining the directional nature of the nozzle. Threads 35 may be provided on the nozzle exterior at the outlet end portion for attachment to the duct, and threads 36 may be provided on the nozzles exterior at the inlet end for connection to a source of pressurized air or other gas. Flattened side areas 37 may be proved on a middle portion of the nozzle for engagement by a wrench during installation. Indicia 38 may be placed on the flattened area or other appropriate location for showing the direction of discharge in a manner visible from the outside of the duct.

An example of how the preferred nozzle embodiment may be installed in a duct is shown in FIG. 4. There, a nozzle having the same construction as that shown in FIG. 3, except for the provision of two orifices 34 and 34' rather than one, extends through the wall 40 of an exhaust duct. A nut 41 may be welded to the duct wall 40 so as to engage the threads 35 on the nozzle. By turning the nozzle body, the extent to which its outlet end protrudes inside the exhaust duct may be adjusted because of the threaded attachment. Usually it is preferred to adjust the protrusion of each nozzle so that the orifices 34 are closely adjacent to the inner surface of the duct so that the gas stream from the nozzles tends to flow in a thin film parallel to the duct surface so as to lift deposits away from the surface. A threaded coupling 42 at the end of conduit 43 engages the threaded inlet end so as to provide the nozzle with a supply of compressed air or other gas. The duct wall 40 may be fabricated from ceramic refractory material, but the type shown in FIG. 4 consists of a metal wall provided with external cooling channels 44 through which a coolant such as water may be passed.

The nozzle shown in FIG. 4 has two opposed orifices 34 and 34' which increases the area that may be impinged on by the nozzle during operation. This may be useful in locations where fewer nozzles are provided and where propelling the deposits in a particular direction is not important. Such a bi-directional nozzle may be mounted so as to discharge in the upstream and downstream directions relative to the exhaust gas flow, or it may be oriented transversely as shown in FIG. 3. Even wider coverage may be achieved with a nozzles having more than two orifices. An example with four orifices 50 is shown in FIG. 5, whereby the nozzle can direct discharges substantially throughout a 360° range extending radially from the nozzle. An example of a location where such a nozzle with radial coverage rather than a directional effect might be used would be at the location of nozzle 24 in FIG. 1 at the upper part of the duct section 19. Another example of where a radial or wide angle nozzle might be useful would be the location of nozzles 28, 29, and 30 in FIG. 1. As described in connection with the FIG. 3 embodiment, the nozzles could be provided with radially extending, cylindrically bored orifices instead of the slot configuration. The slot configuration is sometimes preferred for the thin fan shape of its discharge, but on some occasions it has been found that cylindrical orifices resist plugging better. To produce a wide angle, radial nozzle, substantially more than four cylindrical bore orifices may be used.

Any gas could be discharged from the nozzles to dislodge deposits from the duct, but economics dictate the use of air. Therefore, the use of the word "air" herein to describe the gas discharged from the nozzles should be understood to include the possibility of other gases as well. Although preferred embodiments of the present invention involve a relatively large number of nozzles, the total amount of air added to the gases passing through the exhaust duct is relatively small because the discharge from each nozzle is brief and intermittent. The action may be described as periodic blasts of air that dislodge layers of deposited material that gather on the interior surface of the duct during the time between blasts. The time between blasts is substantially longer than the duration of the blast itself. In other words, air is passing through the nozzles only a small minority of the time. Generally, an air blast lasting about one second or less is adequate, depending upon the nature of the deposit and the length of time between blasts. Longer periods of time between blasts, with the resulting greater build-up of deposits, may require blasts of longer duration. The length of time between blasts is largely a matter of choice as to the amount of air that is to be added to the exhaust gas flow. Some deposits may be removed more effectively by permitting a layer of a certain thickness to build up before it is blasted by the air nozzles, but generally it is preferred to maintain the period of time between cleaning blasts relatively short so that the amount of dislodged material reintroduced into the product stream at any one time is minimized. In any event, cleaning may be carried out much more frequently than was possible with prior art manual methods. However, unduly frequent cleaning leads to excessive amounts of air diluting the exhaust gas stream. To reduce use of air, each nozzle is activated less than half of the time, preferably less than ten percent of the time. In typical examples, adequate cleaning has been obtained by activating each nozzle about five percent of the time or less. These percentages of active time for the nozzles apply over a wide range of cleaning cycle times, and the invention is not limited to any specific cycle time. Examples of cycle times typically range from thirty seconds to thirty minutes, but the principles of the invention may apply to some situations where cycles times greater or less than this range are used. Likewise, the length of time that each nozzle is activated to discharge air typically ranges from less than one second to one minute, but the general principles of the invention do not restrict operation to that range.

All of the nozzles could be activated simultaneously, but it is preferred to activate the nozzles sequentially, either singly or in groups, so as to reduce the volume of compressed air that is required at any one time. Spreading the activation of the nozzles over a period of time also reduces the extent to which the exhaust gas stream flow conditions may be perturbed. In one mode of operation, activation of the nozzles may be timed substantially uniformly throughout the cycle, so that at almost any given time at least one nozzle or group of nozzles are in the active state, even though each nozzle is activated for only a small portion of the cycle. This mode is particularly suitable for short cycles and has the advantage of maximizing the uniformity with which dislodged deposits are reintroduced into the throughput stream. Alternatively, particularly with longer cycles, most or all of the nozzle activations may take place within a relatively small portion of the overall cycle. A rapid sequence of activations may sometimes result in a more effective cleaning action, particularly when the sequence progresses along the length of the duct for propelling material to one end of the duct. For example, nozzles 21 through 26 in FIGS. 1 and 2 may be activated as a group, followed within a few seconds by activation of the similar array of nozzles. Activation of separate nozzles or groups of nozzles may be provided by conventional valve and timer means. For example the compressed air lines to each nozzle or a branch line to a group of nozzles may be fitted with a solenoid operated pneumatic valve 45 controlled by a simple timer device or a programmable process controller.

The volume and pressure of compressed air required and the design of the nozzle orifices are interrelated and depend upon the nature of the deposits to be cleaned and other physical conditions of the particular installation. High air pressures yield higher discharge velocities from the nozzles, producing greater projection and affecting larger areas so that fewer nozzles are needed, but providing high pressures may be more costly. Pressures in the range of 90 to 155 pounds per square inch gauge (620 to 1070 kPa) have been found effective with properly sized nozzle orifices for typical applications, but higher pressures could be advantageous if the extra cost is justified. Lower pressures are also feasible, but require larger numbers of nozzles to clean the same area. For example, pressures as low as 50 pounds per square inch gauge (340 kPa) may be suitable for some situations if installing more nozzles is not an objection. The spacing between nozzles may vary considerably, but in areas of heavy deposits spacings on the order of one to two feet (0.3 to 0.6 meter) have been found to be appropriate in combination with the preferred embodiments described herein.

Similarly, nozzle orifice sizes are not critical to the invention but their choice may be influenced by practical considerations. Large orifices would expend large volumes of compressed air, thereby requiring a more costly, large capacity compressor and excessively diluting the exhaust gas stream. Unduly small orifices, on the other hand, may not develop enough thrust to move some deposits and may be more prone to plugging. Although not limited by the principles of the present invention, some practical nozzle orifices may be found within the range of about one sixteenth to one quarter inch (1.5 to 6 millimeters) in diameter, with some particularly effective examples having diameters of one eighth inch (3 millimeters). These orifice diameter values are for cylindrical bore type orifices. For slot type orifices, these values apply to the narrow dimension of the slot, and the long dimension of the slot can be considerably larger.

For the preferred pressures and orifice sizes described above, the resulting air volume flow rate through a nozzle is typically on the order of 100 to 300 standard cubic feet per minute (47 to 142 standard cubic meters per minute) if left on continuously. But since each nozzle is activated only a fraction of the time, the average volume flow rate is greatly reduced. Even when large number of nozzles are used (15 to 30 is typical) the short activation time can reduce the total amount of air to less than ten percent, preferably less than five percent, of the exhaust gas volume.

Other variations an modifications as are known to those of skill in the art may be resorted to within the scope of the invention as defined by the claims that follow.

We claim:

1. A method of heating a mixture of glassmaking materials in a combustion zone from which exhaust gas exits by way of a duct, and portions of the pulverulent material become entrained in the exhaust and become deposited in the duct, characterized by removing deposited material from the duct by periodically discharging blasts of gas directed toward a plurality of locations at interior surface portions of the duct which have the pulverulent materials deposited thereon.

2. The method of claim 1 wherein the periodic discharge of gas at each location occurs in a cycle in which the length of time between blasts is substantially longer than the duration of a blast.

3. The method of claim 2 wherein the duration of a blast at a location is less than ten percent of the cycle.

4. The method of claim 3 wherein the duration of a blast at a location is less than five percent of the cycle.

5. The method of claim 4 wherein blasts are discharged at different times at different locations.

6. The method of claim 5 wherein blasts are discharged sequentially along the direction that the exhaust gas exits.

7. The method of claim 6 wherein a sequence of blasts is directed to propel dislodged material to one end of the duct.

8. The method of claim 7 wherein the propelled material is directed to be joined with the material being heated in the combustion zone.

9. An apparatus for heating pulverulent glassmaking materials comprising a vessel, means to feed pulverulent material to the vessel, combustion means for heating the interior of the vessel, duct means for passing exhaust gas from the vessel, characterized by a plurality of nozzle means along wall portions of the duct means in communication with a source of compressed gas and configured to direct gas discharges along the interior surface of the duct means, and automatic valve means for intermittently opening the plurality of nozzle means to the compressed gas source.

10. The apparatus of claim 9 wherein at least one of the nozzle means comprises a nozzle body extending through a wall portion of the duct means and an orifice in a side portion of the nozzle body portion within the duct means.

11. The apparatus of claim 10 wherein the nozzle body includes a plurality of orifices in the side portion of the nozzle body within the duct means.

12. The apparatus of claim 11 wherein the orifices are arranged on one side of the nozzle body so as to direct their discharge primarily to one side of the nozzle means.

13. The apparatus of claim 12 wherein the orifices are aligned within the duct means so as to direct their discharge substantially in the direction of a second one of said nozzle means having substantially the same configuration as the first mentioned nozzle means.

14. The apparatus of claim 12 wherein the at least one nozzle means is aligned within the duct means so that the orifices are facing the direction of exhaust gas flow away from the heating vessel.

15. The apparatus of claim 14 said plurality of nozzle means further includes orifices facing counter to the exhaust gas flow.

16. The apparatus of claim 11 wherein said orifices are on opposite side of the nozzle means body.

17. The apparatus of claim 11 wherein said orifices are arranged around the nozzle body so as to direct discharges radially from the nozzle in substantially a full circle.

18. The apparatus of claim 10 wherein the orifice extends into the nozzle body at substantially a right angle to the direction that the nozzle body extends through the wall of the duct means.

* * * * *

UNITED STATES PATENT AND TRADEMARK OFFICE
CERTIFICATE OF CORRECTION

PATENT NO. : 4,969,942

DATED : November 13, 1990

INVENTOR(S) : Ronald L. Schwenninger et al.

It is certified that error appears in the above-identified patent and that said Letters Patent is hereby corrected as shown below:

Column 10, claim 17, line 2, after "nozzle" insert --means--.

Signed and Sealed this

Twenty-third Day of June, 1992

Attest:

DOUGLAS B. COMER

*Attesting Officer*  *Acting Commissioner of Patents and Trademarks*